US005508492A

United States Patent [19]

Pajerski et al.

[11] Patent Number: 5,508,492

[45] Date of Patent: Apr. 16, 1996

[54] APPARATUS FOR EXTENDING BROAD METAL SURFACE AREAS WITH A MAGNETICALLY IMPELLED ARC

[75] Inventors: A. Victor Pajerski, New Kensington; Edward P. Patrick, Murrysville, both of Pa.

[73] Assignee: Aluminum Company of America, Pittsburgh, Pa.

[21] Appl. No.: 213,232

[22] Filed: Mar. 15, 1994

Related U.S. Application Data

[63] Continuation-in-part of Ser. No. 134,165, Oct. 8, 1993, Pat. No. 5,481,084, which is a continuation-in-part of Ser. No. 3,094, Jan. 11, 1993, Pat. No. 5,462,609, which is a division of Ser. No. 670,576, Mar. 18, 1991, Pat. No. 5,187,046.

[51] Int. Cl.$^6$ .......... B23K 9/04

[52] U.S. Cl. .......... 219/123; 148/565; 219/75

[58] Field of Search .......... 219/123, 137 R, 219/125.1, 75; 148/525, 526, 565, 566

[56] References Cited

U.S. PATENT DOCUMENTS

| | | | |
|---|---|---|---|
| 2,280,800 | 4/1942 | Dawson . | |
| 2,472,851 | 6/1949 | Landis et al. | 219/123 |
| 2,936,363 | 5/1960 | Noland et al. | 219/123 |
| 3,248,514 | 4/1966 | Ramsey | 219/123 |
| 3,484,578 | 12/1969 | Sciaky . | |
| 3,937,916 | 2/1976 | Sciaky . | |
| 4,273,986 | 6/1981 | Edson et al. . | |

FOREIGN PATENT DOCUMENTS

| | | | |
|---|---|---|---|
| 177822 | 4/1986 | European Pat. Off. | 219/123 |
| 150859 | 9/1981 | Germany | 219/123 |
| 246737 | 4/1968 | U.S.S.R. | 219/123 |

OTHER PUBLICATIONS

"MIAB welding–a rediscovered process for butt welding", K. I. Johnson, (publisher and date unknown).

*Primary Examiner*—Clifford C. Shaw
*Attorney, Agent, or Firm*—Elroy Strickland

[57] ABSTRACT

Apparatus for electric arc graining the surface of a traveling electrically conductive workpiece, the surface having a substantial area. The graining is effected by a continuous loop electrode having an elongated main body portion and an elongated continuous loop tip edge projecting laterally from a general plane of the main body portion for establishing an arc between the tip edge and the workpiece surface. The arc is moved about the continuous electrode tip by elongated magnetic means located in close proximity to the electrode, the magnetic means including a continuous loop pole member spaced outwardly of and concentric with the continuous loop tip edge. A second pole member of a polarity opposite the outer pole member is located in the general center of the closed loop tip edge.

15 Claims, 4 Drawing Sheets

APPARATUS FOR EXTENDING BROAD METAL SURFACE AREAS WITH A MAGNETICALLY IMPELLED ARC

CROSS-REFERENCE TO RELATED APPLICATION

This is a continuation-in-part application of (U.S. Ser. No. 08/134,165, filed Oct. 8, 1993 now U.S. Pat. No. 5,481,084, which is a continuation-in-part of U.S. Ser. No. 08/003,094, filed Jan. 11, 1993 now U.S. Pat. No. 5,462,609, which is a divisional application of U.S. Ser. No. 670,576, filed Mar. 18, 1991, now U.S. Pat. No. 5,187,046, issued Feb. 16, 1993, the entire contents of which are fully incorporated herein by reference.

BACKGROUND OF THE INVENTION

Aluminum alloy in the form of sheet is a favored material for making lithographic plate ("lithoplate") and foil for electrical capacitors because of its cost effectiveness. However, lithoplate and capacitor foil must be properly grained or toughened, which involves "extending" the surface of the sheet or foil, as explained hereinafter. By "lithoplate" reference is made to the aluminum support material before it is coated with a photosensitive "resist". By "cost effectiveness" we refer to the number of prints of acceptable quality which can be made with a single resist-coated lithoplate before it must be replaced. By "graining" we refer to the roughening of a surface of a metal surface for a number of purposes, such as cleaning, preparing a surface for bonding to another surface, annealing and other property changing effects. And, as disclosed hereinafter, such processes can be performed on an in-line, continuous basis.

Graining an aluminum sheet is the first step towards providing photoresist-coated sheet with the requisite hydrophobic and hydrophilic characteristics which generate image and non-image areas. Though an aluminum alloy is used, commercial lithoplate of aluminum alloy is referred to as "aluminum" sheet or foil, for brevity, partially because nearly pure aluminum, such as 1050 alloy (99.5% pure) is a preferred material for electrochemically etched lithoplate, and partially because pure aluminum is known to be an impractical material for lithoplate.

Lithoplate for off-set printing is typically provided on one side with a layer of an organic composition which is light-sensitive. This layer permits the copying or reproduction of a printing image by a photomechanical process. Upon formation of the printing image, the grained supporting material on which the layer is deposited carries the printing image-areas and, simultaneously forms, in the areas which are free from an image, the hydrophilic image-background for the lithographic printing operation.

The grained supporting surface, laid bare in the non-image area, must be so hydrophilic that it exerts a powerful repulsion of greasy printing ink. The photosensitive layer must adhere strongly to the grained aluminum support, both before and after exposure. It is therefore essential that the grained support be highly stable, both mechanically, from an abrasion standpoint, as well as chemically, particularly relative to alkaline media.

To provide the hydrophobic and hydrophilic characteristics, a grained aluminum sheet is uniformly coated with a photosensitive "resist" composition which is exposed to actinic radiation beamed onto the resist through an overlay which corresponds to the image to be printed. Areas which are comparatively more soluble following irradiation must be capable of being easily removed from the support, by a developing operation, to generate the hydrophilic non-image areas without leaving a residue. The support which has been laid bare must be strongly hydrophilic during the lithographic printing operation, and be able to exert an adequately repelling effect with respect to greasy printing ink.

The cost of producing lithoplate includes the cost of producing foil of an affordable alloy, the foil preferably having a highly uniform microstructure, such as that obtained with controlled fabricating practices, e.g., rolling and thermal treatment to assure uniform response to electrochemical etching. The conventional wisdom has been: the more uniform the microstructure of controllably grained foil, the more uniformly the lithoplate will grain and thus be better suited for use as lithoplate. Lithoplate requires a near perfect surface for printing purposes whereas sheet used for resistance welding does not require such a perfect surface.

In addition to 1050 alloy, other widely used alloys are 3003, 1100 and 5XXX, the latter being specifically produced for the production of lithoplate, as disclosed in U.S. Pat. No. 4,902,353 to Rooy et al, the disclosure of which is incorporated by reference thereto as if fully set forth herein. Though the cost of such alloys is not high relative to the value of the printed material generated, lithoplate is nevertheless deemed costly, and the on-going challenge is to produce more cost-effective lithoplate.

The cost of lithoplate in large part lies in the cost of graining aluminum sheet so that it is free from imperfections, and will provide adequate resolution of the print to be made, as well as many hundreds, if not thousands of prints, before one must change the lithoplate in a printing press. Such imperfection-free graining, at present, is preferably accomplished by choice of an alloy having a microstructure which is particularly well-adapted to electrochemical graining which is closely controlled by a bath composition and the narrowly defined process conditions of its use. Together these result in highly uniform graining or roughening. Not only is the optimum aluminum alloy expensive because of the special processing which may be required to obtain the desired microstructure, in reference to the topography of the printing surface, but there is also the necessary close control for electrochemical graining, and formulating and maintaining a chemical bath. Disposing of exhausted bath compositions further adds to the expense.

Such considerations militate towards finding a non-chemical solution to the problem of graining a metal sheet or foil and to other preparations such as cleaning and annealing. But non-chemical graining, that is, mechanical graining, is generally accepted as being too non-uniform, not only because it is relatively coarse compared to electrochemical etching, but also because it is difficult to control. The on-going search is for a solution to the problem of providing controllably grained surfaces without using an electrochemical process.

One such controllable graining process is disclosed in the above U.S. Pat. No. 5,187,046 issued to the present assignee. The disclosure of that patent is directed to the use of a single or multiple individual electrodes that in at least one embodiment apply helical traces or a raster type graining to a sheet of material clamped on a rotating drum. Such a process is relatively slow and the graining effect is somewhat non-uniform.

SUMMARY OF THE INVENTION

The present invention is directed to means for achieving an essentially flat arc-grained or micro-roughened surface of a sheet or plate of aluminum alloy that can be provided with a relatively fine and slightly non-uniform microstructure by a traveling arc struck between the aluminum sheet and a closed, continuous loop electrode. The terms "closed" and "continuous" refer to the fact that the loop of the electrode is in the form of an endless circle, oval or other suitable configuration, in plan view, such that a continuous electrode path is provided for arc travel when the arc is propelled by a magnetic field. Hence, a continuous magnetic structure is located in close association with the loop of the electrode to propel the arc about the loop of the electrode. The rapidity at which the arc travels about the electrode provides a more rapid graining process than helical and raster type graining using individual electrodes. In addition, the resulting grain can be more uniform.

The shape of the continuous electrode loop can be an open center oval or an open center ellipsis, or preferably, a loop having straight parallel sides connected at their ends by arcuate sections or other suitable shapes.

It is therefore an objective of this invention to provide a non-chemical, non-uniformly arc-grained (relative to the desirable uniform microstructure of an electrochemically etched lithoplate) surface that is particularly well-adapted to lithoplate purposes though such a surface can be used for other purposes in which increased surface area is important, such as capacitor foil, and to apparatus for achieving such graining. In the case of lithoplate, the surface is photosensitized to provide photoresist-coated lithoplate for off-set printing.

It is a specific objective of this invention to provide a lithoplate having an arc-grained, fine microstructure that is only slightly less uniform than an electrochemically etched aluminum surface. When coated with a phosphate-free coating, the surface is unexpectedly well-adapted for use as a support for a resist. The process avoids the inherent lack of control associated generally with mechanical graining, and dispenses with the use of chemical baths which do not have to be maintained, and do not have the often costly care of disposal.

In a preferred embodiment of the invention, a traveling sheet of metal is continuously directed over a process drum, such as a metal backup roll located beneath the above graining apparatus. When an arc is struck between the traveling sheet and the electrode, the arc is magnetically impelled about the loop of the electrode. The sheet is arc grained as it travels between the roll and electrode. If both sides of the sheet require graining, a second backup roll and head can be located in a manner that directs the opposite side of the sheet between the second roll and second head, as shown in FIG. 5 of the drawings of the application, and described in detail hereinafter.

The continuous electrode and magnetic means extend in the direction of the axis of the metal roll such that the traveling arc moves cross-wise the sheet as the sheet travels between the roll and electrode. Such an arrangement provides a capability for treating lithographic sheet, capacitor foil, other web or sheet-like material, and many other product surfaces, as the surfaces are translated along a pass line when the speed of the arc matches that of the line. The speed of the arc traveling about the electrode depends upon the strength of the magnetic field, which should be as constant as possible, the amount of electrical current flowing through the electrode and arc, the length of the arc gap, the material being treated, the electrode material and the type of cover gas used.

It is a further objective of the invention to provide a graining system suitable for treating, cleaning, and/or etching packaging foil and sheet, autobody sheet, capacitor foil, and other metals and materials, such as mill rolls, for a variety of applications. Because the process is a non-chemical one, it is prey neither to the problems of controlling the quality of chemicals nor to those of handling chemicals.

BRIEF DESCRIPTION OF THE DRAWINGS

The foregoing and additional objectives and advantages of the invention will best be understood by reference to the following detailed description, accompanied with illustrations of preferred embodiments of the invention, in which illustrations having like reference numerals refer to like elements, and in which.

DETAILED DESCRIPTION OF PREFERRED EMBODIMENTS

Figure 1:
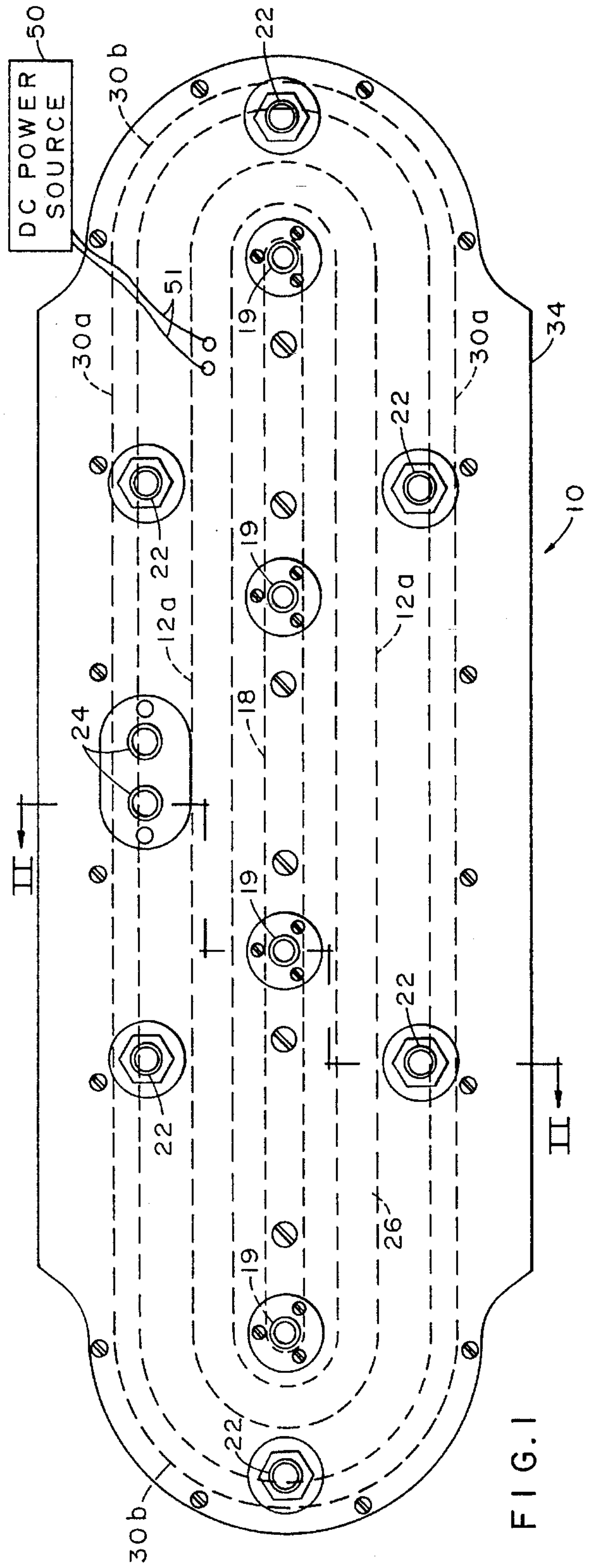
FIG. 1 is a plan view illustrating a head device providing a magnetically impelled arc for graining an electrically conductive surface.
Figure 2:
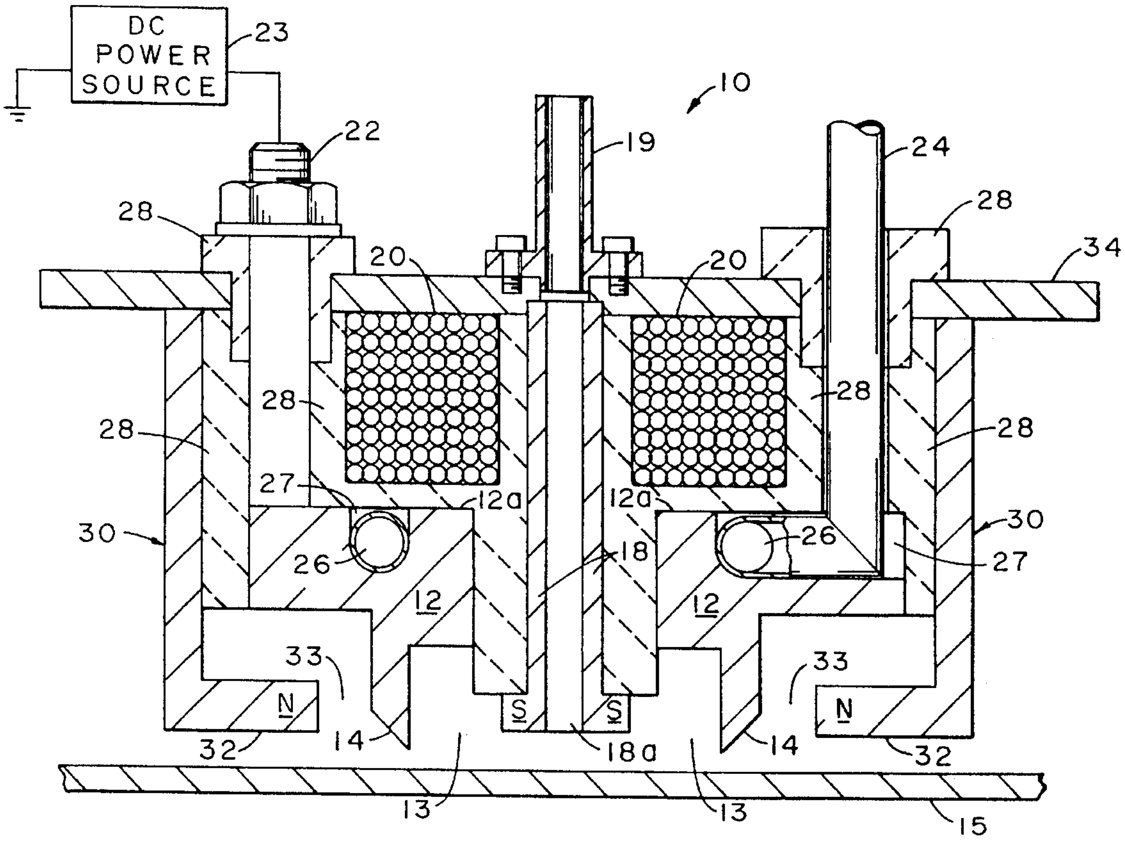
FIG. 2 is a sectional view of the head device of FIG. 1 taken along line II–II of FIG. 1.

In a preferred embodiment, the objectives and advantages of the invention are effected by arc-graining a surface of an aluminum sheet using the arc generating device depicted in FIGS. 1 and 2 of the drawings. Referring to these Figures, a head device 10 is shown which includes a continuous or closed loop electrode 12 having an open center 13 and a lower arc edge or tip 14. As shown in FIG. 2, the electrode has a main body portion with tip 14 extending laterally from a general plane of the main body portion to provide a continuous edge that lies in a plane parallel to the plane of a workpiece 15. Since the head device of FIG. 2 is disposed above the workpiece, tip 14 is shown extending in a vertical, downward direction toward the workpiece such that the lower continuous edge of the tip is facing downwardly.

Electrode 12 can be formed from a single piece of metal, such as copper, for example, to provide a continuous loop and an edge or tip. Preferably the electrode has parallel side portions which are connected at their ends by arcuate end portions, these portions providing a continuous path for a magnetically impelled arc (not shown). An upper surface **12*a* of the electrode is visible in phantom in FIG. 1, the shape of electrode being that of the overall head, including a cooling tube or conduit 26 and an outer shell 30. If the material of electrode 12 is one that is not easily and economically made as a single piece continuous structure, electrode 12** can be formed from relatively short segments (not shown) which are then connected in a suitable fashion to complete the loop of the electrode.

Extending through the plane of electrode 12 and lengthwise of the open center 13 of electrode 12 (FIG. 1) is a hollow, ferromagnetic member 18. The hollow member can be used to conduct a flow of gas into the vicinity of tip 14 and a traveling arc (not shown) established between the tip and the surface of workpiece 15. Member 18 can distribute a controlled atmosphere through its open lower end 18*a* to the arc site, though the graining effected by the arc can be accomplished under normal atmospheric conditions. Gas can be supplied to member 18 by one or more nipples 19, as shown in FIGS. 1 and 2. The lower end of member 18, namely 18*a*, serves as an inner pole of a magnetic circuit for impelling the arc, as discussed in detail hereinafter. If a controlled atmosphere is not necessary, a vertically disposed, ferromagnetic plate can be substituted for 18 to provide the inner pole. The term "ferromagnetic" refers to any material capable of conducting magnetic flux and thereby establishing magnetic poles at opposed ends of members made of such ferromagnetic material.

Figure 9:
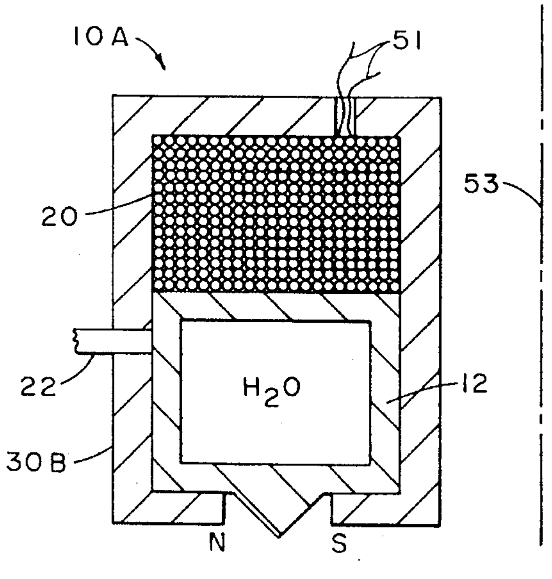

An electromagnetic coil 20 of closely packed insulated wires is schematically shown in section in FIGS. 2 and 9 located behind (above) electrode 12. The coil is disposed around hollow member 18, the coil being preferably wound to have the general shape of electrode 12. This locates the coil between power leads 22 in FIGS. 1 and 2, electrically connected to electrode 12, and hollow member 18. As depicted in FIG. 1, several such power leads 22 connected to electrode 12 helps to evenly supply power to the electrode thereby reducing the opportunity for uneven electrical resistance in the loop of the electrode and thus uneven current discharge along the length of the electrode in the process of arc graining. A power source 23 is shown schematically in FIG. 2 connected to a lead 22.

A vertical tube 24 is also shown located on one side of the coil in FIG. 2. There are actually two such tubes, as seen in the plan view of FIG. 1. Tubes 24 are employed to conduct a coolant to and from the head to cool the same. One of the two vertical tubes 24 conducts a coolant into head 10 while the other exits the coolant. The coolant while in the head is transported by a horizontal tube or conduit 26 that is shown nestled in a recess 27 provided in the upper portion of electrode 12 and beneath coil 20. The ends of conduit 26 connect respectively to the entry and exit tubes 24.

Electrically insulating structures 28 are provided to separate the electrically conductive components of the head from each other and also serve to prevent the straying of high frequency energy from electrode 12 if and when such energy is employed to establish an arc. A preferred material for the insulating structures 28 is ceramic.

Head 10 includes further an outer peripheral ferromagnetic shell 30 for enclosing head components, and for serving as part of a magnetic circuit of the invention. Shell 30 preferably comprises two generally parallel side plates 30*a*, as seen in dash outline in FIG. 1, connected at their opposed ends to two C-shaped or arcuate members 30*b*. The shell, however, can be a single piece structure or any other type of structure for suitably enclosing the components of the head, and for providing a path for conducting magnetic flux generated by coil 20.

The lower edge of shell 30 includes an inwardly directed plate 32 having an open center 33 to accommodate electrode edge or tip 14, and to provide a second magnetic pole for conducting magnetic flux between the inner edges of 32 and the first pole, namely, end 18*a* of hollow member 18. A permanent magnet structure can be used to provide such poles, as discussed hereinafter.

The upper edge of shell 30 abuts against and is suitably secured to an upper solid plate 34 that completes the housing of the head, and through which nipples 19, electrodes 22 and tubes 24 extend. Plate 34 can be a single or multiple piece construction. The plate engages the upper end of member 18 to provide a continuous conductive path between the two for channeling the magnetic field produced by coil 20 in providing the magnetic poles provided by 18*a* and 32. The material of 30, 32, 34 and that of channel 18 is ferromagnetic so that a magnet circuit (i.e. the typical iron core) is completed about coil 20 in a manner that provides opposed, north and south poles at lower plate 32 and the lower end of channel 18. In this manner, the magnetic flux produced by coil 20 extends across the lower tip 14 of electrode 12.

The components of head 10 are generally held together by shell 30, upper plate 34 and inner member 18. For example, the shell, plate and inner member can be welded together, and leads 22 can be threaded, as shown in FIG. 2, to receive nuts that secure the insulating bushings and the other insulating means 28, as shown in FIG. 2, together if the leads are suitably connected to the electrode 12. Similarly, insulating bushings located about vertical tubes 24 can be suitably connected to upper plate 34.

As depicted in FIGS. 1 and 2, the components of head 10 are generally located in close proximity of each other to provide a compact device. Such a device provides ease of handling and the mounting of the head for its arc treating purposes.

In viewing the sectional presentation in FIG. 2, the distances between electrode tip 14 and the inner edges of lower plate 32 and the lower channel edges 18*a* are substantially larger than the arc distance between tip 14 and the surface of the workpiece 15 to be grained, i.e., if the metal structures of 32 and 18*a* are too close to electrode 12, the arc will tend to jump to such metal structures rather than to the surface to be treated. This can be avoided if 32 and 18*a* are at the same potential as electrode 12. Such an embodiment is shown in FIG. 9 of the drawings and is discussed in detail below.

Figure 5:
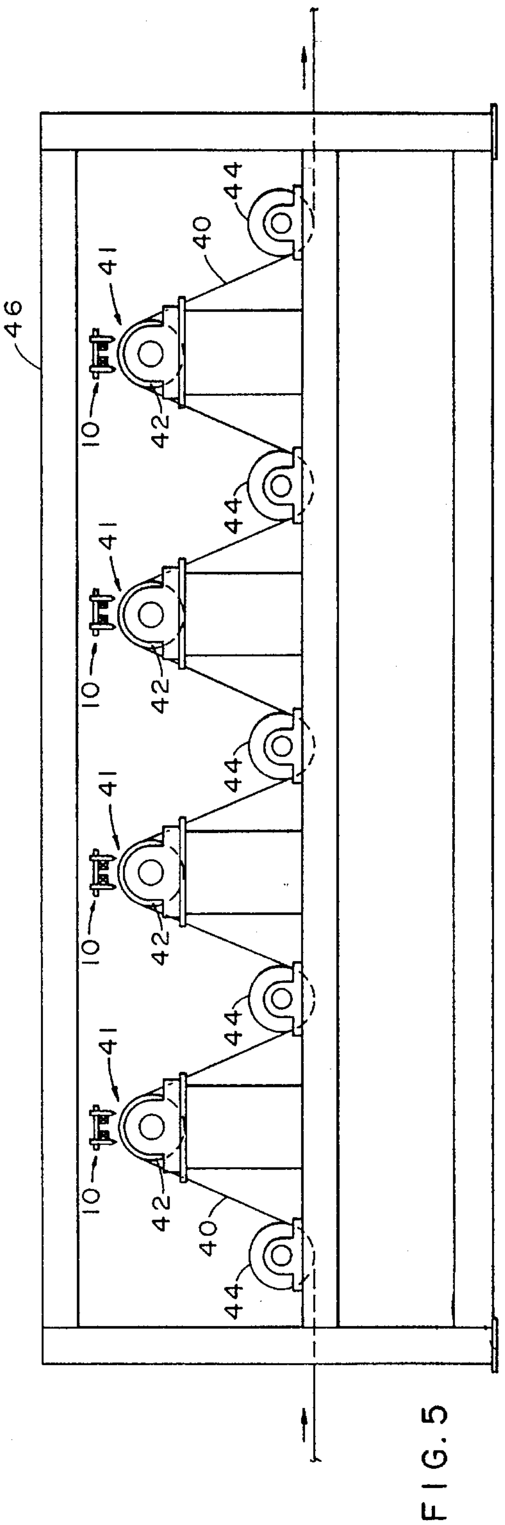
FIG. 5 shows a modified version of the apparatus of FIG. 4.
Figure 3:
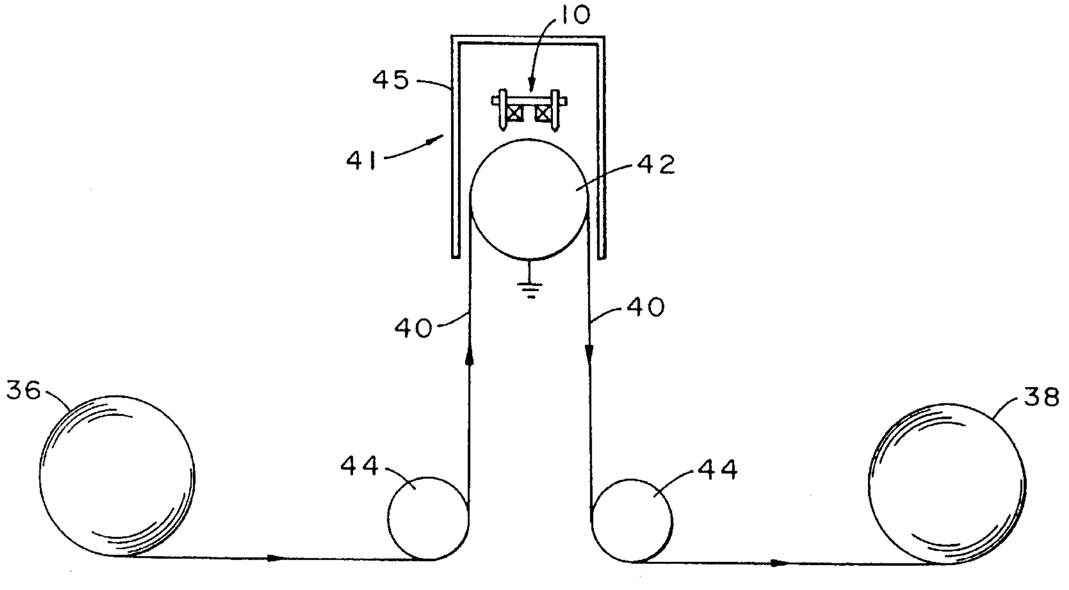
FIG. 3 schematically illustrates a continuous line utilizing the head device of FIGS. 1 and 2 and a metal roll for commutating arc current while simultaneously transporting a sheet of material past the head device.
Figure 4:
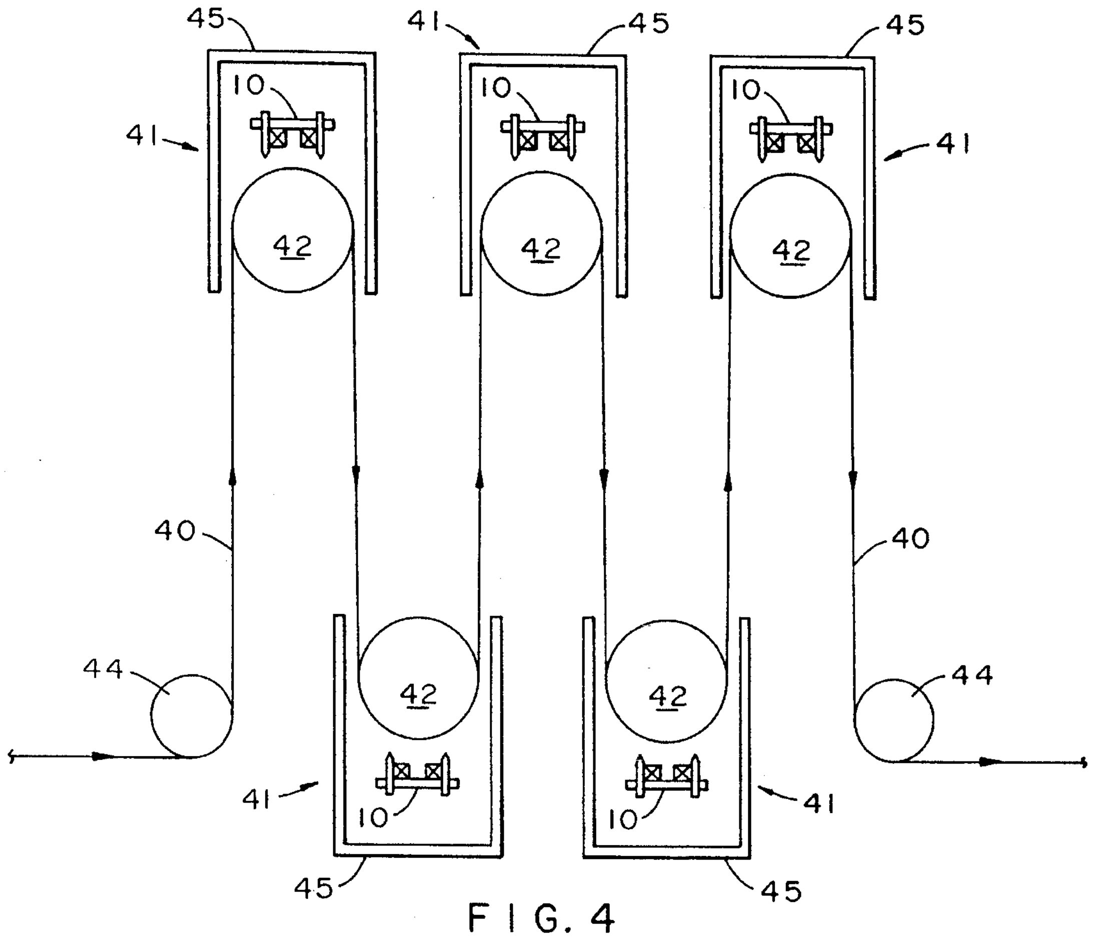
FIG. 4 is a schematic illustration of multiple head devices for treating both sides of a continuous sheet of traveling material.

Preferably, the head device depicted in FIGS. 1 and 2 is employed in a continuous line in which a coil 36 of electrically conductive material 40 is unwound and paid off to the systems shown in FIGS. 3 to 5 of the drawings. In this manner, arc graining of the material can be accomplished on a mass produced basis. After the graining is accomplished, the sheet travels to a take-up location 38 for recoiling.

To establish an arc between electrode tip or edge 14 and an electrically conductive surface (15 in FIG. 2 and 40 in FIGS. 3 to 5) in a perpendicular direction relative to the conductive surface, an appropriate electrical potential is applied between the electrode and the conductive surface. This requires the surface to be electrically connected to one terminal of power supply 23 (FIG. 2). In FIG. 3, this is accomplished by support means 42 (in the form of a metal roll) engaging sheet 40, said means being shown connected to ground. The ferromagnetic material of the structures surrounding coil 20 channels a constant magnetic field generated by coil 20, as provided by current flow through the coil, to the inner edges of lower plate 32 and the lower edges 18*a* of inner member 18. In this manner opposed north and south poles are provided on opposed sides of electrode edge 14. The opposed north and south poles provide magnetic flux at a right angle to the perpendicular flow of arc current into and/or out of traveling sheet 40. The interaction of the magnetic flux and arc current produces an impelling force that is exerted on the arc in the direction perpendicular to both the arc current and magnetic flux; in FIG. 1, the force is either clockwise or counterclockwise, depending on the direction of current flow in coil 20, as supplied from a DC power source 50 over leads 51 (FIG. 1 ), and the direction of arc current into or out of the plane of the paper (or both in the case of an AC current supply to electrode 12). In this manner, the arc is propelled about the continuous extent of the loop of electrode edge 14, the arc serving to grain the surface of sheet 40, as the sheet travels past the arc moving along the tip. The arc travels two paths across the sheet such that in traveling past the moving arc, the surface of the sheet facing the electrode tip is treated twice by the arc. And since the arc paths across the sheet are preferably parallel, the treatment effected across the sheet width is the same if the parallel sides of the electrode extend to or beyond the edges of the sheet.

Continuing with FIG. 3, to maintain proper electrical contact of sheet 40 with a power supply, as well as properly positioning the sheet relative to head device 10 at a treating or graining location or station 41, the sheet can be directed to and from metal roll 42 by two bridle rolls 44 that wrap the sheet around a substantial portion of the metal roll surface. The metal roll is maintained in parallel position with respect to electrode edge 14, and sheet 40 engages and wraps around the surface of the roll such that its surface is also maintained in such parallel relation with the electrode tip, as the sheet travels over and against the roll.

In addition, tensioning sheet 40 insures intimate contact with metal roll surface 42 such that the sheet presents a smooth surface to electrode tip 14, and thus a constant arc length for even treatment of the sheet surface.

Further, intimate contact between the sheet and metal roll reduces the chances of the arc overheating and melting the sheet (which could also affect the properties of the sheet material), as the heat of the sheet is transferred to the roll. Preferably, the material of roll 42 is a high thermal and electrically conductive metal, such as copper, aluminum or a copper clad roll, so that the heat of the arc and sheet is conducted from the sheet to the roll, and electrical contact between the sheet and roll is maintained at minimal electrical resistance.

If roll 42 is maintained at ground potential, the sheet will be maintained at ground potential, as it travels over the roll. In this manner, an electrical arc is easily struck and can be continuously maintained between the sheet and electrode 12, as the sheet travels over the roll, if one terminal of power supply 23 is connected to ground. A sliding contact (not shown) can be used to directly connect the roll to ground or to another suitable potential. Such a contact provides a constant electrical potential for the sheet at the location of electrode edge 14, a potential that may not be provided if reliance is made on current conduction through bearings and bearing housings of the roll.

FIG. 4 of the drawings shows arc graining of both sides of a traveling sheet at consecutive, spaced apart, upper and lower, treating stations 41, with a head device 10 being located at each station. In the view of FIG. 4, the heads at the top of the figure roughen one face or side of the sheet, as it travels pass the heads. When the sheet travels downwardly to a lower station 41, the other face or side of the sheet is presented to lower heads 10 such that the other face or side is grained, i.e., the face of the sheet grained at the upper stations is on the "inside" of the sheet when it reaches the lower rolls. Thus, when the grained surface reaches the lower rolls, it is in contact with the lower rolls, while the "outer" face of the sheet is exposed for arc graining by lower heads 10.

In FIGS. 3 and 4, cabinet structures 45 (shown only schematically) provide an enclosure for the head devices and backup rolls to contain the atmosphere needed.

FIG. 5 of the drawings shows a frame structure 46 for mounting and containing a series of treating stations 41 and bridle rolls 44 for directing a sheet of material 40 through the structure.

Figure 6:
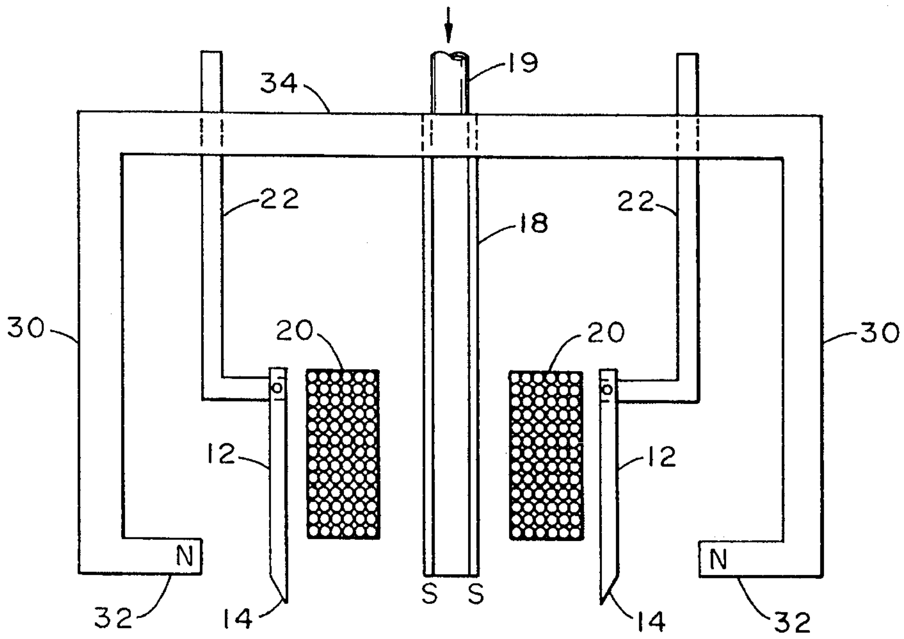
FIGS. 6 to 9 show additional embodiments of the invention in regard to the location of magnetic means for impelling a graining arc.
Figure 7:
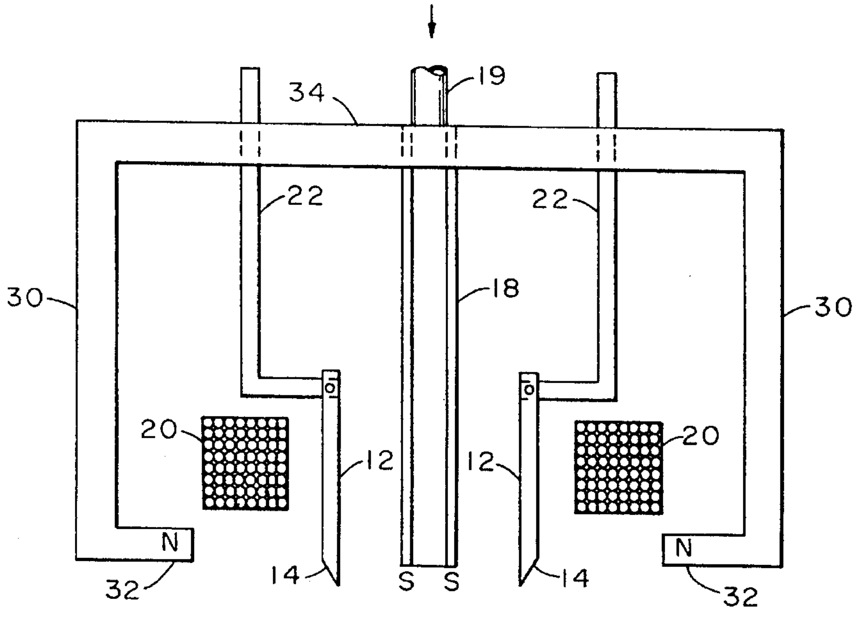

As discussed above in connection with FIG. 2 of the drawings, coil 20 is located behind electrode 12 and generally centered about inner member 18. As shown schematically in FIGS. 6 and 7 of the drawings, the coil can be located either within the boundaries of the electrode (FIG. 6) or outside of the electrode and in the general plane of the electrode (FIG. 7).

As-rolled aluminum sheet can have a typical surface roughness of 0.25 to 0.75 microns or micrometers, or ten to thirty microinches overlaid with an oxide film, the thickness of which may vary widely. This roughness is evidenced by generally parallel grooves formed on the surface of the sheet by grind lines on the rolls of the rolling mill that produced the sheet. The roughness peaks are relatively low and the valleys between them are correspondingly not deep. Hence, the surface of the sheet is relatively smooth such that roughening is needed to increase or extend the surface.

The basic technique is applied to the task at hand by proper adjustment of electrical current to provide the desired arc at electrode edge 14. Power source 23, which supplies arc current and voltage to electrode 12, can be a commercial or a special power supply. The length of the arc and the open circuit voltage between the electrode tip and sheet can be varied, using a range of voltages between about ten to 1000 volts, depending upon the material to be treated, the amount of graining desired and the rate of material travel past the electrode tip. The amount of current can be varied from ten to many thousands of amperes depending upon the length of the loop path, the desired speed of the arc and the amount of graining desired. Typical parameters for graining the surface of an aluminum sheet made of 1100 alloy traveling at twenty feet per minute comprise an arc distance of about 0.100 inch, an arc voltage of thirty-five volts, and arc current of 500 amperes.

When sheet 40 is threaded into position (FIGS. 3 to 5), magnetizing current is supplied to coil 20, and the arc initiated. The position of head(s) 10 is adjusted to a preset gap distance relative to the sheet to maintain the arc while the sheet is translated past the head(s). The precise conditions for adjusting the magnetically impelled arc, the rate at which the sheet is translated, and other operating details are adjusted as needed for a particular application.

Figure 8:
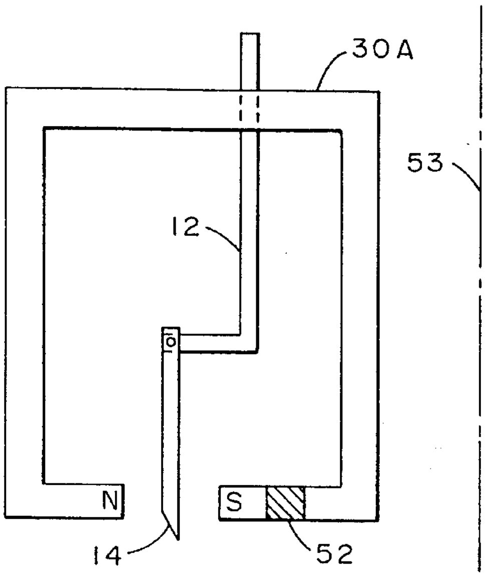

The invention can employ permanent magnet(s) in place of coil 20 when it is not necessary to adjust magnetic field strength by simple control of the current supplied to windings of a coil. The use of permanent magnets eliminates coil 20, its power supply (50) and connecting leads (51). The outer shell structures 30, 32 and 34 can be permanent magnets, along with that of inner member 18, and thereby provide the necessary poles on the opposed sides of electrode edge 14. FIG. 8 of the drawings shows schematically one-half, as indicated by center line 53, of a continuous electrode and permanent magnet construction of the invention. More particularly, an iron member 30A is shown located about an electrode 12, the iron member terminating adjacent electrode edge 14. North and south poles are provided at the ends of 30A by a permanent magnet element 52 located in the iron member. Element 52 can be located anywhere in the member, or the entire member 30A can be a permanent magnet.

FIG. 9 of the drawings shows schematically a compact head construction 10A in which the electrical potential of a continuous loop graining electrode 12 is the same as that of continuous north/south pole ends of an iron enclosure 30B. As in FIG. 8, only one-half of the continuous electrode and magnetic structure is shown.

Continuing with FIG. 9, electrode 12 is depicted as a hollow structure for conducting a coolant, such as water, therethrough. In contact with the hollow electrode is the outer iron shell 30B, while behind (above) the electrode is a coil 20 that, when energized, provides the ends of 30A adjacent the electrode tip with opposed north and south poles.

The arc-grained surface provided by the head of the invention consists essentially of a multiplicity of closely spaced, rounded peaks or fingers, which provide extended surfaces. The extended surfaces can be chemically treated to provide the rounded peaks with a durable coating if the sheet is to be used for lithographic purposes. In the case of the apparatus of FIG. 5, lower rolls 44 can be located in a bath of water (for boehmiting), or in an electrolytic bath for anodizing or nitriding.

Coil 20 can be made (wound) as a single unitary structure or may comprise multiple sections suitably connected and held together. In either case, the magnetic structure has an open center and is otherwise configured to the shape of electrode 12 so that the flux produced by the magnetic structure can impel the arc generated at tip 14 about the loop of the tip.

While the invention has been described in terms of preferred embodiments, the claims appended hereto are intended to encompass all embodiments which fall within the spirit of the invention.

What is claimed is:

1. Apparatus for electric arc graining electrically conductive sheet or plate material having a substantial surface area and traveling past the apparatus during the graining process, said apparatus comprising:

at least one electrode including an elongated loop body portion and an elongated continuous loop tip projecting laterally from a general plane of said body portion, said loop body and tip having two essentially parallel elongated side path portions and two arcuate end path portions that complete the loop of the electrode;

means for establishing an arc between said tip and electrically conductive material;

continuous magnetic means including a first loop pole member spaced outwardly around and generally concentric with said loop tip, and elongated in the direction of side path portions of the loop tip, and a second elongated loop pole member opposite in polarity to said first pole member and having a continuous surface disposed generally within and substantially concentric with said loop tip; and means for energizing said pole members such that a magnetic field extends between the pole members whereby an arc established between said tip and the electrically conductive material is moved in a repetitively continuous manner about the loop of said tip and across said material in contact therewith as it travels past the arc.

2. The apparatus of claim 1 including a plurality of power leads having ends connected to said electrode at spaced locations along the elongated loop thereof, and opposed ends extending away from the electrode for connection to a power source whereby electrical current from said source can be supplied to the electrode at said spaced locations.

3. The apparatus of claim 1 in which the magnetic means includes an electromagnetic coil and a ferromagnetic channel structure located about the coil and electrode.

4. The apparatus of claim 1 in which the magnetic means includes an electromagnetic coil located within an open center of the loop of the electrode.

5. The apparatus of claim 1 in which the magnetic means includes an electromagnetic coil located outside of the electrode loop and in the general plane of the electrode loop.

6. Apparatus for electric arc graining a workpiece having an electrically conductive, substantial surface area during travel of the workpiece and surface area past the apparatus, said apparatus comprising:

at least one electrode including an elongated loop body portion and a continuous elongated loop tip projecting laterally from a general plane of said elongated body portion;

means for establishing an arc between said tip and said workpiece;

magnetic means located in close proximity to said loop electrode and including a continuous coil elongated in the direction of the elongated loop body portion;

an elongated first closed loop ferromagnetic pole member spaced outwardly around and generally concentric with said loop tip and continuous coil;

a second elongated ferromagnetic pole member opposite in polarity to said first pole member and having a continuous surface disposed generally within and substantially concentric with said loop electrode tip; and means for energizing said coil whereby an arc established between said tip and the workpiece is moved by a magnetic field extending between the pole members in a continuous repetitive manner about the loop of the electrode tip and across the workpiece as the workpiece and surface area travel past the arc and electrode tip.

7. A magnetically impelled arc producing device comprising:

an elongated electrode having a continuous loop configuration and a continuous elongated loop electrode tip extending laterally from a general plane of the electrode and about which an arc established between the tip and a workpiece surface can be repetitively impelled, and an open center containing a hollow member elongated in the direction of the loop electrode and tip and extending generally perpendicular through the plane of the electrode loop and having one end located in the vicinity of the continuous electrode tip, at least one elongated continuous electromagnetic coil located adjacent the plane of the electrode loop and about the hollow member, and providing a magnetic field when supplied with electrical current, and an elongated housing surrounding the loop electrode, magnetic coil and hollow member, said housing including a continuous wall portion extending inwardly toward the elongated electrode tip, said hollow member and housing, including said inwardly extending wall portion, being made of ferromagnetic material that conducts the magnetic field provided by said coil between the one end of the hollow member and the inwardly extending wall portion of the elongated housing to provide magnetic poles of opposite polarity at the locations of the inwardly extending wall portion and the one end of said hollow member in the vicinity of the continuous electrode tip.

8. Apparatus for extending at least one surface of an electrically conductive material having a substantial surface area and traveling relative to a location containing the apparatus, the apparatus comprising:

support means at said location for receiving said conductive material in intimate contact therewith, as the material travels against said support means, said support means having a ground potential that the conductive material assumes upon intimately contacting the support means, at least one continuous loop electrode for producing an electrical arc at the location at which the conductive material travels against the support means, and having a positive electrical potential with respect to the support means and conductive material such that an arc can be struck between the electrode and material;

said loop electrode having an elongated configuration, with its major axis extending across the conductive material; and continuous elongated magnetic means having its major axis extending across the conductive material located adjacent said elongated electrode for moving said arc repetitively along the loop of said electrode and in contact with the substantial surface area to traverse said area as the material travels against the support means.

9. The apparatus of claim 8 in which the support means is a metal roll.

10. The apparatus of claim 9 including two bridle rolls for directing the traveling material respectively to and from the metal roll.

11. The apparatus of claim 9 including a second metal roll, elongated loop electrode, and elongated magnetic means for treating an opposed surface area of the traveling material.

12. Apparatus for extending a surface of a workpiece having a generally planar, substantial surface area with an electric arc, as the workpiece travels past the apparatus and electric arc, comprising:

an elongated ferromagnetic channel structure for housing in a generally concentric manner an elongated loop electrode, a continuous elongated electromagnetic coil extending in a direction generally parallel and in close proximity to a general plane of the electrode, an elongated continuous conduit means for cooling the apparatus and extending in a plane located in close proximity to said general plane of the electrode, an elongated hollow inner member made of ferromagnetic material located in the substantial center of the elongated electrode and electromagnetic coil, and means for electrically insulating the channel structure from the electrode and conduit means, and the electrode, electromagnetic coil and conduit means from each other, said electrode having a continuous elongated loop tip extending laterally from the plane of the elongated electrode loop, said channel structure having a continuous elongated end portion located outside the loop of the continuous lateral electrode tip, and said electromagnetic coil, when supplied with electrical current, producing a magnetic field that is coupled to the inner ferromagnetic member and to the outer ferromagnetic channel structure such that the end portion of the channel structure provides a magnetic pole of one polarity outside of the loop of the continuous elongated tip, and the inner member provides a magnetic pole of opposite polarity inside the loop of the continuous tip, said poles being located in a substantially common plane, which plane lies substantially in a plane occupied by the continuous lateral tip of the electrode such that an arc struck between said tip and a workpiece can be repetitively impelled about the loop of the tip.

13. The apparatus of claim 12 in which the shape of the elongated electrode loop in plan view is elliptical.

14. The apparatus of claim 12 in which the shape of the electrode loop in plan view is oval.

15. An elongated electrode structure for extending a surface area of an electrically conductive workpiece having a substantial surface area, comprising:

a main body portion having a continuous, elongated loop configuration, a continuous, elongated loop, electrode tip extending laterally from a general plane of the main body portion for establishing an electrical arc between the tip and the workpiece, and about which the arc continuously and repetitively travels when magnetically impelled, and a recess provided in a face of the main body portion of the electrode structure opposite that of the continuous tip for receiving a conduit for conducting a cooling fluid therethrough.

* * * * *